United States Patent [19]

Muckerheide

[11] Patent Number: 5,005,182

[45] Date of Patent: Apr. 2, 1991

[54] LASER PUMPING APPARATUS

[75] Inventor: Myron C. Muckerheide, Port Washington, Wis.

[73] Assignee: Seton Health Care Foundation, Milwaukee, Wis.

[21] Appl. No.: 419,757

[22] Filed: Oct. 11, 1989

[51] Int. Cl.$^5$ .............................................. H01S 3/093
[52] U.S. Cl. ...................................... 372/72; 372/70; 372/109
[58] Field of Search ...................... 372/69, 70, 109, 72

[56] References Cited

U.S. PATENT DOCUMENTS 3,353,115  11/1967  Maiman ................................. 372/70
4,225,826  9/1980   Lewis et al. .......................... 372/70
4,228,406  10/1980  Lewis et al. ......................... 372/109

*Primary Examiner*—Frank Gonzalez
*Assistant Examiner*—Susan S. Morse
*Attorney, Agent, or Firm*—Dick and Harris

[57] ABSTRACT

An improved laser pumping apparatus in which a plurality of generally spherical beads are disposed in pumping energy transmitting juxtaposition with the active outer surface of a laser element so as to be positioned between the active outer surface of the laser element and a pumping energy source. in a neodymium doped yttrium aluminum garnet laser element pumped by a flash lamp, the beads are made of silicon. The beads are approximately 50 to 100 microns in diameter and may be attached directly to the active outer surface of the laser element, such as by using a pumping energy transmitting adhesive, or the beads may be attached to an intermediate transparent or translucent pumping energy transmitting member such as a thin sleeve that fits over a laser element configured as a rod.

9 Claims, 2 Drawing Sheets

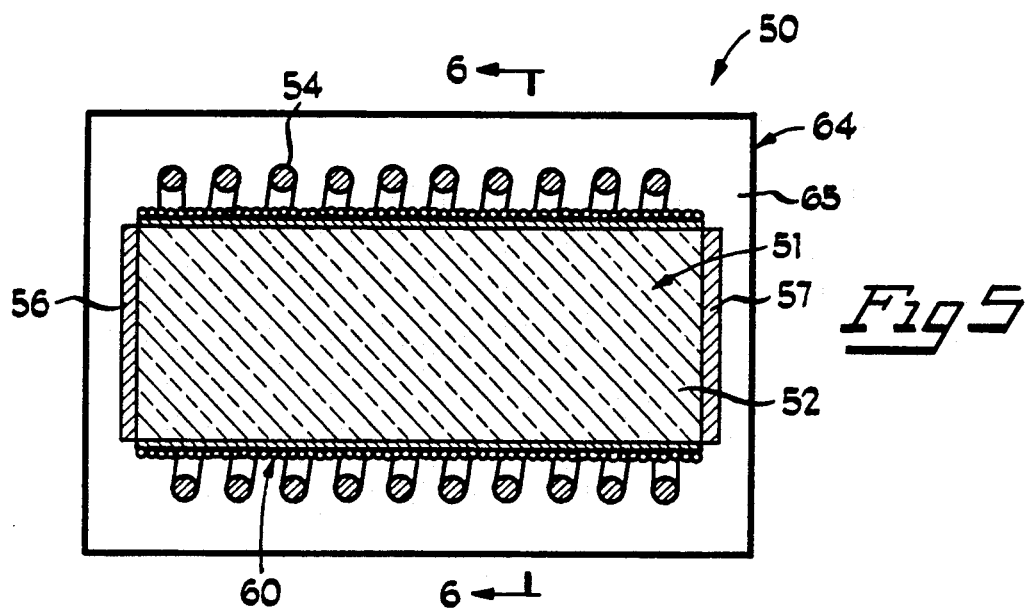
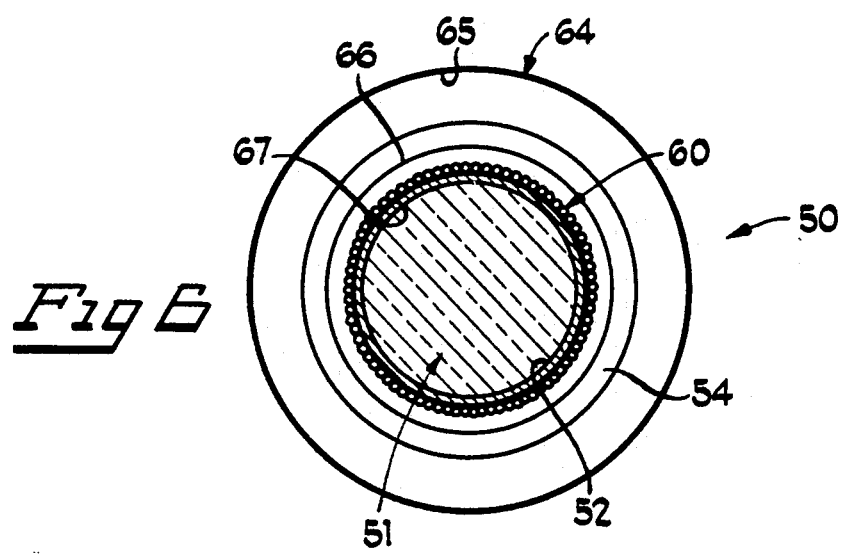

LASER PUMPING APPARATUS

BACKGROUND OF THE INVENTION

The present invention relates in general to lasers, and in particular, to an improved, more efficient laser pumping apparatus.

It has long been recognized, as in Keefe, Jr. U.S. Pat. No. 3,611,190 issued Oct. 5, 1971, that the amount of pumping energy entering the body of a laser element is related to the extent of exposed laser element surface area on which the pumping energy impinges. However, the energy absorbed from the pumping source produces heat in the laser element which becomes more difficult to dissipate as the cross section or diameter of a laser rod is increased in order to increase the surface area. Moreover, it has been recognized, as in Keefe, Jr. that changes in temperature in the laser element cause unequal indices of refraction across the lateral extent of a laser rod because of the linear expansion of the element or material.

Although face pumped disc lasers, as opposed to side pumped rod lasers, provide a greater active surface area exposed to the pumping source while minimizing the heat problems, the face pumped lasers disc have the disadvantages of there being more "walking off" of the optical waves and a greater spread of the resulting laser light beam. Keefe, Jr. teaches a segmented laser rod immersed in coolant fluid with a segment spaced apart a sufficient distance to permit free passage of sufficient coolant but close enough to prevent pump light from passing through the spaces between the segments as a solution to the recognized problems.

Martin, U.S. Pat. No. 3,581,229 issued May 25, 1971 discloses a face pumped laser with a prism disposed between the pumping source and the face of the laser element. The prism in the Martin disclosure is of the Porro type having one right angle and two forty-five degree angles and is fabricated from fused silica having an index of refraction greater than the square root of two. The pumping source includes an array of xenon flash lamps parallel to each of the two surfaces of the prism not adjacent the active surface of the face laser element. The area of the surface of the prism adjacent the active surface of the laser element forms a forty-five degree angle with each of the two surfaces that are exposed to the pumping source and which themselves meet at a ninety degree angle. Consequently, the pumping flux density in the Martin device is increase by the square root of two over pumping apparatus not employing the prism. However, the Martin device requires precise geometric alignments among the pumping source, the prism and the surface of the laser element and does not lend itself to use on a side pumped laser rod in which the pumping energy impinges upon the curved cylindrical surface of the rod.

Sturel U.S. Pat. No. 3,974,454 issued Aug. 10, 1976 discloses a side pumped laser rod having the shape of a cylinder of revolution whose shape is obtained by the rotation about an axis of an arc of a curve turning its convexity toward the axis which is then surrounded by a liquid having a refraction index close to that of the rod and which is kept in place by a tube made of a material transparent to the radiation emitted by a flash lamp. The purpose of the Sturel laser amplifier is to decrease the detrimental effect of the diffraction caused by the passing of the radial gaussian beam through the laser element comprising the rod and liquid. Sturel has the recognized disadvantages of requiring the specially shaped rod and surrounding it with a liquid having a like refraction index. Moreover, while Sturel is suppose to result in a beam having an even density of power at the output of the amplifier, it does not result in a laser that makes more efficient use of the pumping source.

Maiman U.S. Pat. No. 3,353,115 issued Nov. 14, 1967 discloses in the embodiment illustrated in FIG. 6 the filling of the space between a laser rod and a hollow flash tube with fluorescent material that absorbs "white" light emitted by the flash tube and re-emits predominately green light that is said to be more efficiently absorbed by the laser rod.

Lewis et al. U.S. Pat. No. 4,228,406 issued Oct. 14, 1980 teaches packing glass spheres or balls that are doped to absorb radiation at the wavelength of spurious or parasitic emissions around the curved edge of a face pumped laser disc to absorb or attenuate parasitic or spurious emissions which are in directions transverse to the path of the radiation through the laser disc as well as physically supporting the laser disc.

It is thus an object of the present invention to provide an improved laser pumping apparatus that may be readily assembled for effectively increasing the active surface area of the laser element to increase the efficiency of transmission of the pumping energy from the pumping source to the laser element.

It is a further object of the subject invention to provide an improved laser pumping apparatus comprised of a plurality of generally spherical beads disposed in pumping energy transmitting juxtaposition with at least part of the active outer surface of a laser element between the pumping source and the active outer surface.

It is also an object of the present invention to provide an improved laser pumping apparatus in which at least part of the active outer surface of the laser is coated with a pumping energy transmitting adhesive and the generally spherical beads are disposed in contact with the adhesive to secure the generally spherical beads in pumping energy transmitting juxtaposition with the active outer surface of the laser element.

An additional object of the present invention is to provide an improved laser pumping apparatus in which a plurality of generally spherical beads are secured to an intermediate pumping energy transmitting member which is then mounted on the active outer surface of the laser element between the pumping energy source and the active outer surface.

These and other objects of the invention will become apparent in light of the present specification, drawings and claims.

SUMMARY OF THE INVENTION

The present invention comprises an improved laser pumping apparatus for increasing the efficiency of transmission of the pumping energy from the pumping source to the laser element in which a plurality of generally spherical beads is disposed in pumping energy transmitting juxtaposition with at least part of the active outer surface of a laser element between the pumping source and the active outer surface.

The generally spherical beads are approximately 50 to 100 microns in diameter.

In the preferred embodiment, the generally spherical beads coat the entire active outer surface of a laser element.

In one form of the present invention, at least part of the active outer surface of the laser element is coated with a pumping energy transmitting adhesive and the generally spherical beads are disposed in contact with the adhesive to secure the generally spherical beads in pumping energy transmitting juxtaposition with the active outer surface of the laser element.

Preferably, the entire active outer surface of the laser element is coated with the adhesive and the generally spherical beads.

When, in an improved laser pumping apparatus of the present invention, the laser element is a neodynium doped yttrium aluminum garnet and the pumping energy source is light, the beads are silicon.

In another embodiment of the invention, the generally spherical beads are secured to an intermediate pumping energy transmitting member which is then mounted on the active outer surface of the laser element.

The intermediated member is preferably configured as a sleeve that fits over the laser element and when the laser element is configured as a rod, the intermediate member is configured as a tubular sleeve that fits over the rod.

BRIEF DESCRIPTION OF THE DRAWINGS

FIG. 5 of the drawings is a schematic cross-sectional side view of the improved laser pumping apparatus according to an alternative embodiment of the invention taken generally along the axis of the laser element rod and additionally showing a thin non-opaque sleeve member surrounding the rod, a plurality of generally spherical beads disposed in pumping energy transmitting juxtaposition with the active outer surface of the rod by being secured to the outside surface of the intermediate sleeve member and a flash lamp pumping source plus an outer reflecting shield surrounding the apparatus; and FIG. 6 is a schematic cross-sectional end view taken generally along line 6—6 of FIG. 5 and looking in the direction of the arrows and showing the laser element rod, the intermediate non-opaque sleeve member, the plurality of generally spherical beads secured to the outside of the sleeve member, the flash lamp pumping source and the reflecting shield surrounding the apparatus.

DETAILED DESCRIPTION OF THE DRAWINGS

Figure 1:
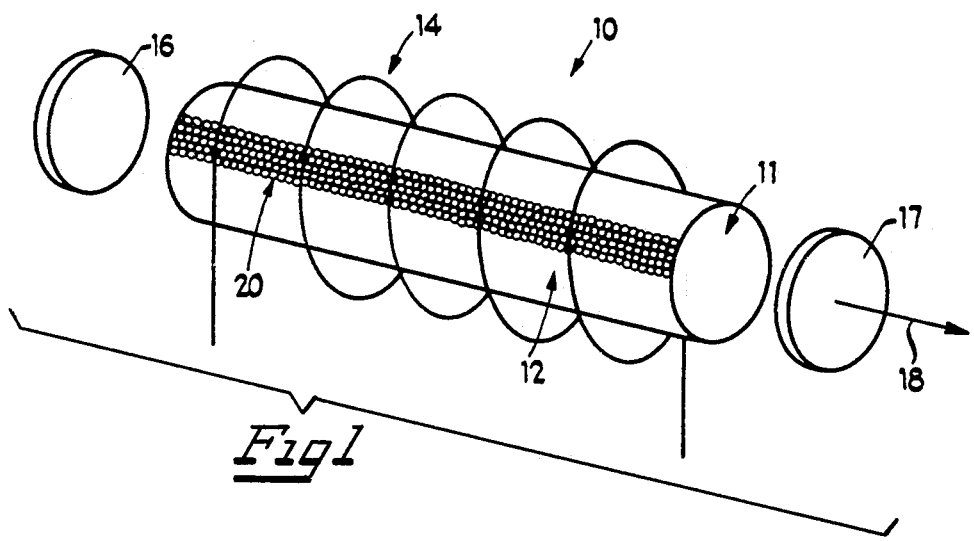
FIG. 1 is schematic perspective view of the improved laser pumping apparatus, according to a first embodiment of the present invention, showing a longitudinal strip covering approximately one-tenth of the active outer surface area of the laser element rod coated with a plurality of generally spherical beads.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Improved laser pumping apparatus 10 is shown schematically in the perspective view of FIG. 1 as including a laser element which is a generally cylindrical laser rod 11, the shape of which is formed by the rotation of a straight line about an axis. Of course, the laser element could be any other convenient shape such as an elongated slab. Laser rod 11 is, in the preferred embodiment, a neodymium doped yttrium aluminum garnet crystal that is approximately 4 millimeters in diameter and 5.4 centimeters long. Rod 11 could be a ruby rod or a neodymium doped glass or any other crystal conventionally used for laser elements. Surrounding the active outer cylindrical surface 12 of rod 11, and spaced from rod 11, is a helical flash lamp pumping energy source 14 that is itself energized by a suitable electrical power source (not shown). Although a helical flash lamp or strobe is shown in the drawings and referred to throughout this application, it will be appreciated by those skilled in the art that linear strobes could readily be substituted and would function in substantially the same way to achieve substantially the same result as the helical flash lamp or strobe. Adjacent one end of rod 11 is a complete mirror 16; adjacent the opposite end of rod 11 is a partial mirror 17 through which the resulting laser light beam passes in the direction of the arrow designated by reference numeral 18.

Disposed in pumping energy transmitting juxtaposition with part of active outer surface 12 of laser rod 11 are a plurality of generally spherical beads 20 that are made of silicon and are in the order of 50 to 100 microns in diameter. As illustrated in FIG. 1, the plurality of generally spherical beads 20 are disposed in a strip approximately 3 millimeters wide along substantially the entire length of rod 11 resulting in about one-tenth of the overall active surface 12 being coated with generally spherical beads 20. The generally spherical beads 20 are secured to active outer surface 12 of rod 11 by a adhesive. Any conventional adhesive such as epoxy or super glue that can be used to secure two pieces of glass together can be used to secure generally spherical beads 20 to surface 12 of rod 11.

A test conducted with the improved laser pumping apparatus schematically illustrated in FIG. 1, in which only about one-tenth of the active outer surface of the laser rod was covered with the generally spherical beads, resulted in a ten micro joule increase in the power output over a similar laser element rod, mirrors and flash lamp pumping energy source that did not have any coating of generally spherical beads 20.

Figure 2:
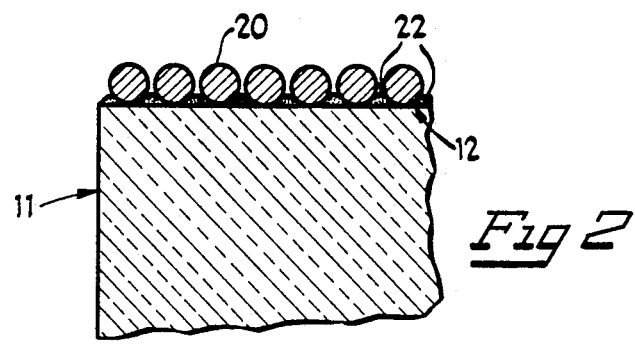
FIG. 2 is an enlarged scale, fragmentary, elevated cross-sectional view taken generally along the axis of the rod and through the strip of the generally spherical beads shown in FIG. 1 to illustrate the use of an adhesive to secure the beads to the active outer surface of the rod.

FIG. 2 shows, in greatly enlarged scale, a fragmentary section of rod 11 with a plurality of generally spherical beads 20 secured directly to active outer surface 12 by means of an adhesive 22 such as an epoxy or super glue through which the pumping energy from a source such as flash lamp 14 may be transmitted. While generally spherical beads 20 are shown in FIGS. 1 and 3 through 6 as disposed in generally aligned rows in a single layer for ease of illustration, it is not required for the purposes of the present invention that the beads be so accurately aligned. Accordingly, a laser element rod 11 having its active outer surface 12 coated with a suitable adhesive 22 maybe inserted into a stream or reservoir of generally spherical beads to secure them to active outer surface 12 by means of the adhesive 22. Alternatively, rod 11, with a coating of a suitable adhesive 22, may be rolled upon a layer of the beads disposed upon a generally flat surface.

Figure 3:
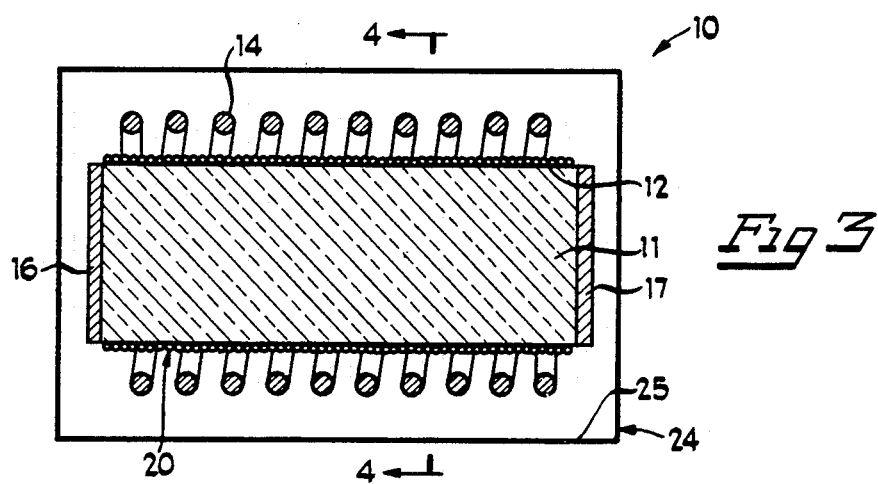
FIG. 3 is a schematic cross-sectional side view of the improved laser pumping apparatus according to a second embodiment in the present invention taken generally along the axis of the laser element rod and also showing the generally spherical beads coating the entire active outer surface of the laser element, plus a helical flash lamp pumping energy source, along with a reflecting shell surrounding the improved laser pumping apparatus of the present invention.

Improved laser pumping apparatus 10 is shown in a schematic cross-sectional longitudinal view in FIG. 3 as comprising laser rod 11 with its active outer surface 12 positioned within an helical flash lamp pumping source 14. At one end of rod 11 is a full mirror 16 and at the other end a partial mirror 17. Disposed adjacent the entire active outer surface 12, as contrasted to only one-tenth of the active outer surface as illustrated in FIG. 1, is a plurality of generally spherical beads 20 secured by an adhesive (not shown in FIG. 3) directly to the active outer surface. Thus, generally spherical beads 20 are disposed in pumping energy transmitting juxtaposition with substantially the entire active outer surface 12 of rod 11 between the active outer surface and helical flash lamp pumping source 14. Surrounding the outside of helical flash lamp 14 is a shell 24 having a highly reflective inner surface 25 for reflecting the pumping energy of helical flash lamp 14 that is directed outwardly away from rod 11 and generally spherical beads 20 back toward generally spherical beads 20 and rod 11. The coating of generally spherical beads 20 increases the overall pumping light absorption surface 12 of rod 11 by about three times that of a rod of the same diameter that is not coated with the generally spherical beads.

In addition to increasing the overall light absorbing surface area of the active outer surface 12 of rod 11, generally spherical beads 20 increase the efficiency of absorption of energy from the pumping source with beads 20 refocusing the light from pumping source 14 in an random fashion adjacent active outer surface 12 of rod 11 thereby delaying the impact of the light upon rod 11 as the light is forced to pass through the generally spherical beads. In addition, generally spherical beads 20 assist in rattling the laser radiation within rod 11 helping to amplify and reinforce the waves which travel normal to the cylindrical wall of rod 11. The beads 20 accept the pumping energy light and rattle the light in numerous geometric configurations adding to a longer dwell time for the active pumping of rod 11, particularly when used in combination with a surrounding shell having a highly reflective surface such as 25. Thus, this improved apparatus for pumping laser element rods results in a longer flow or radiance period from the numerous reflections produced.

While the present invention has been described in terms of a neodymium doped yttrium aluminum garnet rod 11 and a flash lamp pumping energy 14 source with generally spherical silicon beads 20, the beads could be made of other simple or complex compounds or elements so that stimulated conditions could also be obtained from many different pumping sources such as strobes, laser, chemical or electrical or gas emissions.

Figure 4:
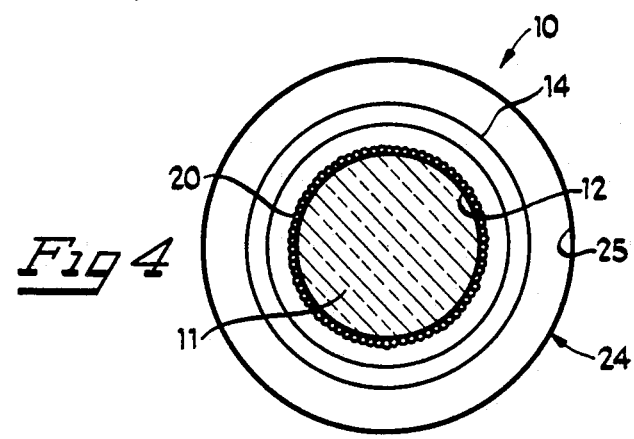
FIG. 4 is a schematic cross-sectional end view taken generally along line 4—4 of FIG. 3 and looking in the direction of the arrows, and showing the laser element, the generally spherical beads coating the entire active outer surface of the laser element and the pumping source according to the first embodiment of the present invention along with a reflecting shell surrounding the improved laser pumping apparatus of the present invention.

FIG. 4 shows another schematic cross-sectional view of improved laser pumping apparatus 10. Again, laser element rod 11 is at the center of the apparatus and is generally centrally disposed within a helical flash lamp pumping energy source 14. Disposed in pumping energy transmitting juxtaposition with the entire active outer surface 12 of rod 11 are a plurality of generally spherical beads 20 secured to and coating surface 12 by means of an adhesive (not shown). About helical flash lamp pumping source 14 is shell 24 with its highly reflective inter surface 25.

FIGS. 5 and 6 of the drawings show yet another embodiment of the invention in which the generally cylindrical beads 60 are secured to an intermediate pumping energy transmitting member. Improved laser pumping apparatus 50 is shown schematically in FIG. 5 as having a laser element rod 51 with an active outer surface 52, a total reflective mirror 56 at one end and partial reflective mirror 57 at the other end. Rod 51 is generally centrally disposed within a helical flash lamp pumping energy source 54. A plurality of generally spherical pumping energy transmitting beads 60, having a diameter of 50 to 100 microns, are secured on a thin transparent or translucent, non-opaque intermediate pumping energy transmitting tubular sleeve 66, and more particularly to outside surface 67 of sleeve 66. Intermediate sleeve member 66 is then fitted over outer active surface 52 of laser element rod 51. The sleeve can be made of plastic, glass, a P-switching material or the same material as laser element rod 51 and should be kept very thin to facilitate transmission of light from flash lamp pumping energy source 14. Generally spherical beads 60 may be secured to outside surface 67 of tubular sleeve 66 in the same manner as beads 20 were secured directly to active outer surface 12 of rod 11. Alternatively, beads 60 could be bonded to sleeve 66 using other conventional adhesives or fused to the sleeve if the material from which the sleeve is made permits fusing. A shell 64 having a highly reflective inner surface 65 surrounds flash lamp pumping source 54, beads 60, sleeve 66 and laser element rod 51. Of course, if other configurations of the laser element are used, such as a slab instead of a 1 rod, the shape of the sleeve will have to be conformed.

In FIG. 6, the improved laser pumping apparatus, of FIG. 5 is shown in a schematic cross-sectional end view. Laser element 51, or more particularly its active outer surface 52, is shown surrounded by sleeve 66 having a plurality of generally spherical beads 60 secured to the entire outer surface 67 of tubular sleeve 66. Disposed around the assembly of laser element rod 51, tubular sleeve 66 and generally spherical beads 60 is helical flash lamp pumping source 54 and around pumping energy source 54 is cylindrical shield 64 having its highly reflective inner surface 65.

The foregoing description and drawings merely explain and illustrate the invention and the invention is not limited thereto, except insofar as the appended claims are so limited, as those skilled in the art who have the disclosure before will be able to make modifications and variation therein without departing from the scope of the invention.

What is claimed is:

1. An improved laser pumping apparatus comprising:
   laser element having an active outer surface;

pumping energy source; and a plurality of generally spherical beads disposed in juxtaposition with at least part of said active outer surface and between said pumping energy source and said active outer surface whereby said plurality of generally spherical beads serve to increase the overall energy absorbing surface area of the active outer surface, refocus the energy from the pumping source in a random fashion adjacent the active outer surface, and lengthen the dwell time to increase the pumping efficiency of the apparatus.

2. The invention according to claim 1 in which said generally spherical beads are approximately 50 to 100 microns in diameter.

3. The invention according to claim 1 in which the entire active outer surface of said laser element is coated with said generally spherical beads.

4. The improved laser pumping apparatus according to claim 1 in which at least part of said active outer surface of said laser element is coated with a pumping energy transmitting adhesive and said generally spherical beads are disposed in contact with said adhesive to secure said generally spherical beads in juxtaposition with said active outer surface of said laser element.

5. The invention according to claim 4 in which the entire active outer surface of said laser element is coated with said adhesive and said generally spherical beads.

6. The invention according to claim 1 in which:
said laser element is a neodymium doped yttrium aluminum garnet;
said pumping energy source is light; and
said beads are silicon.

7. The improved laser pumping apparatus according to claim 1 in which said generally spherical beads are secured to an intermediate pumping energy transmitting member which is then mounted on said active outer surface of said laser element.

8. The invention according to claim 7 in which said intermediate member is configured as sleeve that fits over said laser element.

9. The invention according to claim 7 in which:
said laser element is configured as a rod; and
said intermediate member is configured as a tubular sleeve that fits over said rod.

* * * * *